United States Patent
Roder et al.

(10) Patent No.: US 7,290,737 B2
(45) Date of Patent: Nov. 6, 2007

(54) NONSURVIVABLE MOMENTUM EXCHANGE SYSTEM

(75) Inventors: Russell Roder, Odenton, MD (US);
Eliezer Ahronovich, Fairfax, VA (US);
Milton C. Davis, III, Silver Spring, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/251,537

(22) Filed: Sep. 29, 2005

(65) Prior Publication Data

US 2007/0069081 A1    Mar. 29, 2007

(51) Int. Cl.
*B64G 1/28* (2006.01)
(52) U.S. Cl. .................................................. 244/165
(58) Field of Classification Search ................. 244/165
See application file for complete search history.

(56) References Cited

U.S. PATENT DOCUMENTS

| | | | | |
|---|---|---|---|---|
| 3,348,374 A * | 10/1967 | Schalkowsky | ........... | 60/641.13 |
| 3,767,139 A * | 10/1973 | Fischell | ...................... | 244/165 |
| 3,868,072 A * | 2/1975 | Fogarty | ...................... | 244/167 |
| 3,955,858 A * | 5/1976 | Poubeau | .................... | 310/90.5 |
| 3,968,352 A * | 7/1976 | Andeen | ....................... | 701/13 |
| 4,001,887 A * | 1/1977 | Platt et al. | .................... | 360/90 |
| 4,170,904 A * | 10/1979 | Fischell et al. | ........... | 74/5.6 E |
| 5,873,285 A * | 2/1999 | Barnes | .................... | 74/572.21 |
| 6,113,033 A * | 9/2000 | Parks et al. | ................. | 244/165 |
| 6,135,392 A * | 10/2000 | Wakugawa | ................. | 244/164 |
| 6,377,352 B1 * | 4/2002 | Coronato et al. | ........... | 356/460 |
| 6,650,418 B2 * | 11/2003 | Tweedy et al. | ............. | 356/477 |

OTHER PUBLICATIONS http://www.ueet.nasa.gov/materials/elements.php.*
Ithaco Space Systems, T-Wheel Reaction/Momentum Wheel Assemblies Brochure, Jan. 1996, Ithaca, NY, USA (4 pages).

* cited by examiner

*Primary Examiner*—Rob Swiatek

(57) ABSTRACT

A demiseable momentum exchange system includes a base and a flywheel rotatably supported on the base. The flywheel includes a web portion defining a plurality of web openings and a rim portion. The momentum exchange system further includes a motor for driving the flywheel and a cover for engaging the base to substantially enclose the flywheel. The system may also include components having a melting temperature below 1500 degrees Celsius. The momentum exchange system is configured to demise on reentry.

38 Claims, 3 Drawing Sheets

NONSURVIVABLE MOMENTUM EXCHANGE SYSTEM

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

The present invention relates to a momentum exchange system and, more particularly, to a momentum exchange system that is configured to demise on reentry into the Earth's atmosphere.

2. Description of the Related Art

The increase in recent years in the number of spacecraft occupying frequently used orbits has caused growing international concern over orbital debris. Such debris, including retired spacecraft, as well as spacecraft components, has the potential to damage or destroy other spacecraft in these orbits.

Concern over orbital debris has led to international agreements providing guidelines for end-of-mission disposal of spacecraft. Moreover, the U.S. National Aeronautics and Space Administration (NASA) has put in place policy directives and safety standards governing the generation of debris by spacecraft and end-of-mission spacecraft disposal. In order to limit the risk of personal injury or damage to property on Earth, the NASA directives mandate either a controlled reentry, in which the spacecraft is guided to fall into the ocean, or an uncontrolled reentry and demise of the spacecraft.

There are a number of drawbacks to controlled reentry. A controlled reentry requires additional fuel on the spacecraft and may also require additional propulsion systems to properly position the spacecraft to land in a remote location over the ocean. These factors increase the complexity, weight, and cost of the spacecraft.

Another drawback of controlled reentry relates to fault tolerance. Spacecraft system redundancies, particularly in guidance systems, are required to ensure that operators can maintain control of a spacecraft. When redundancy of one or more spacecraft components is lost during a mission, premature controlled reentry may be required. In those situations, spacecraft that are fully capable of achieving their science or other mission goals are lost.

Spacecraft designed for uncontrolled reentry and demise are not subject to the above-described drawbacks. When such spacecraft have reached the end of their mission, they are actively guided back into the atmosphere, or reenter passively through orbital decay, and safely demise with essentially no debris hitting the ground. Demise of a reentering spacecraft is caused by friction between the spacecraft and the atmosphere. The friction applies a combination of deceleration loads on the spacecraft, which act to break the structure apart, and a tremendous amount of heat, which melts or vaporizes the structural components.

There has been some difficulty, however, in designing spacecraft so that all of the components fully demise. In general, a spacecraft component will survive reentry if its melting temperature is sufficiently high, if it is shielded by other components, or if its shape enables it to lose heat fast enough to keep its temperature below the melting point. A particular spacecraft component that is subject to these effects is the momentum exchange system.

In some spacecraft, the momentum exchange system, which comprises a portion of a spacecraft's attitude control system, provides attitude stability to the spacecraft and allows the execution of slewing maneuvers by storing angular momentum and transferring the angular momentum to the spacecraft. The angular momentum is stored and transferred in momentum exchange systems using a rotating flywheel.

Conventional momentum exchange systems comprise a stainless steel or titanium flywheel having a solid web supporting a relatively massive rim. These systems further comprise a drive motor having a stator containing large amounts of iron, and a rotor containing magnets that are buried within thick subcomponents. Finally, the entire assembly is encased in a thick metal enclosure. Thus, conventional momentum exchange systems utilize materials having a high melting point and contain parts that are shielded within the enclosure, thereby limiting the likelihood of demise on reentry.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

To overcome the drawbacks of the prior art and in accordance with the purpose of the invention, as embodied and broadly described herein, one aspect of the invention relates to a momentum exchange system comprising a base, a flywheel rotatably supported on the base, the flywheel comprising a web portion defining a plurality of web openings, and a rim portion, a motor for driving the flywheel, and a cover for engaging the base to substantially enclose the flywheel, wherein the system is configured to demise on reentry.

As used herein, "demise" means to be substantially destroyed, and/or dissipated by melting, vaporization, and/or erosion. Further, as used herein, "reentry" means entering and passing through at least a portion of the Earth's atmosphere from space. The Earth's atmosphere is generally considered to extend from the Earth's surface to an altitude of approximately 120 km.

According to another aspect of the invention, the web portion defines a total web area and the web openings define an open web area, and the open web area is approximately 50% of the total web area.

As used herein, "total web area" means the area of the circle defined by the inner diameter of the rim portion of the flywheel. Further, as used herein, "open web area" means the sum of the areas of the plurality of web openings.

In a further aspect, the open web area is approximately 60% of the total web area. In yet another aspect, the open web area is approximately 70% of the total web area.

Another aspect of the invention relates to a momentum exchange system comprising a base, a housing associated with the base, a flywheel rotatably supported on the housing, wherein the flywheel comprises a material having a melting point below approximately 1500 degrees Celsius, a motor for driving the flywheel, and a cover substantially enclosing the flywheel, wherein the system is configured to demise on reentry.

In a further aspect, the flywheel comprises a material having a melting point below approximately 1000 degrees Celsius. In yet another aspect, the flywheel comprises a material having a melting point below approximately 700 degrees Celsius.

A still further aspect of the invention relates to a momentum exchange system comprising a base, a housing disposed on the base, a flywheel rotatably supported on the housing, the flywheel comprising a web portion defining a plurality of web openings, and a rim portion, wherein the flywheel comprises a material having a melting point below approximately 1500 degrees Celsius, a motor for driving the flywheel, and a cover engageable with the base to substantially enclose the flywheel, wherein the system is configured to demise on reentry.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Momentum exchange systems include control moment gyros, momentum wheel assemblies, and reaction wheel assemblies. In control moment gyros, the flywheel runs at constant speed and transfers angular momentum through the rotation of the flywheel about one or more gimbals. Momentum wheel assemblies and reaction wheel assemblies transfer angular momentum by accelerating and decelerating the flywheel. The rotational axis of reaction wheels and momentum wheels, unlike control moment gyros, usually is fixed with respect to the vehicle. A reaction wheel is designed to operate at a zero bias while a momentum wheel is designed to operate at a biased, or nonzero momentum.

The present invention is described and illustrated with reference to a reaction wheel assembly. However, control moment gyros, momentum wheel assemblies, and other systems utilizing flywheels to store and/or transfer angular momentum are considered to be within the scope of the invention.

Figure 1:
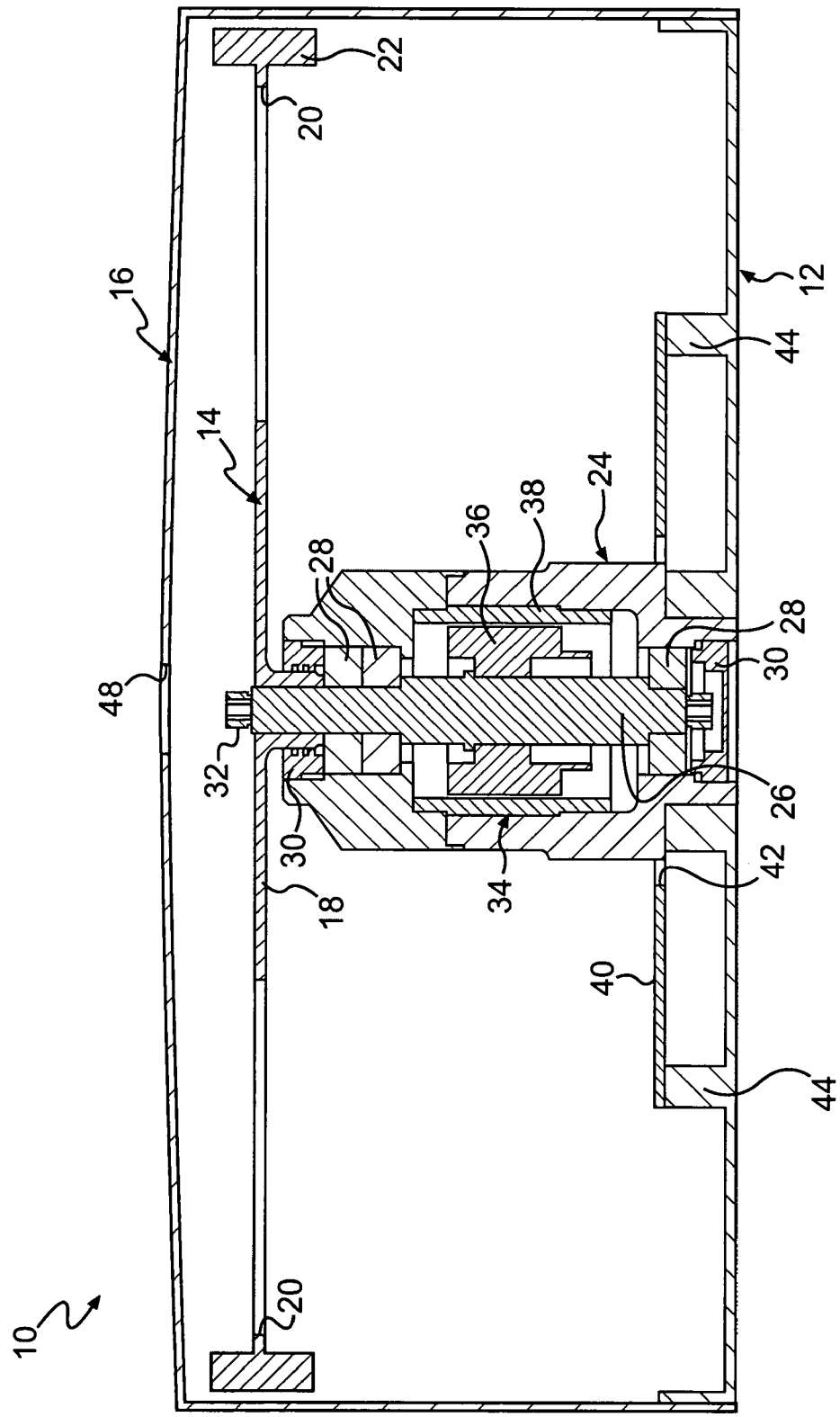
FIG. 1 is a cross-sectional view of an embodiment of a momentum exchange system of the present invention.

An embodiment of a momentum exchange system 10 of the present invention is shown in a cross-sectional view in FIG. 1. As shown, the system 10 comprises a base 12, a flywheel 14 rotatably supported on the base 12, and a cover 16 for engaging the base 12 to substantially enclose the flywheel 14.

Figure 2:
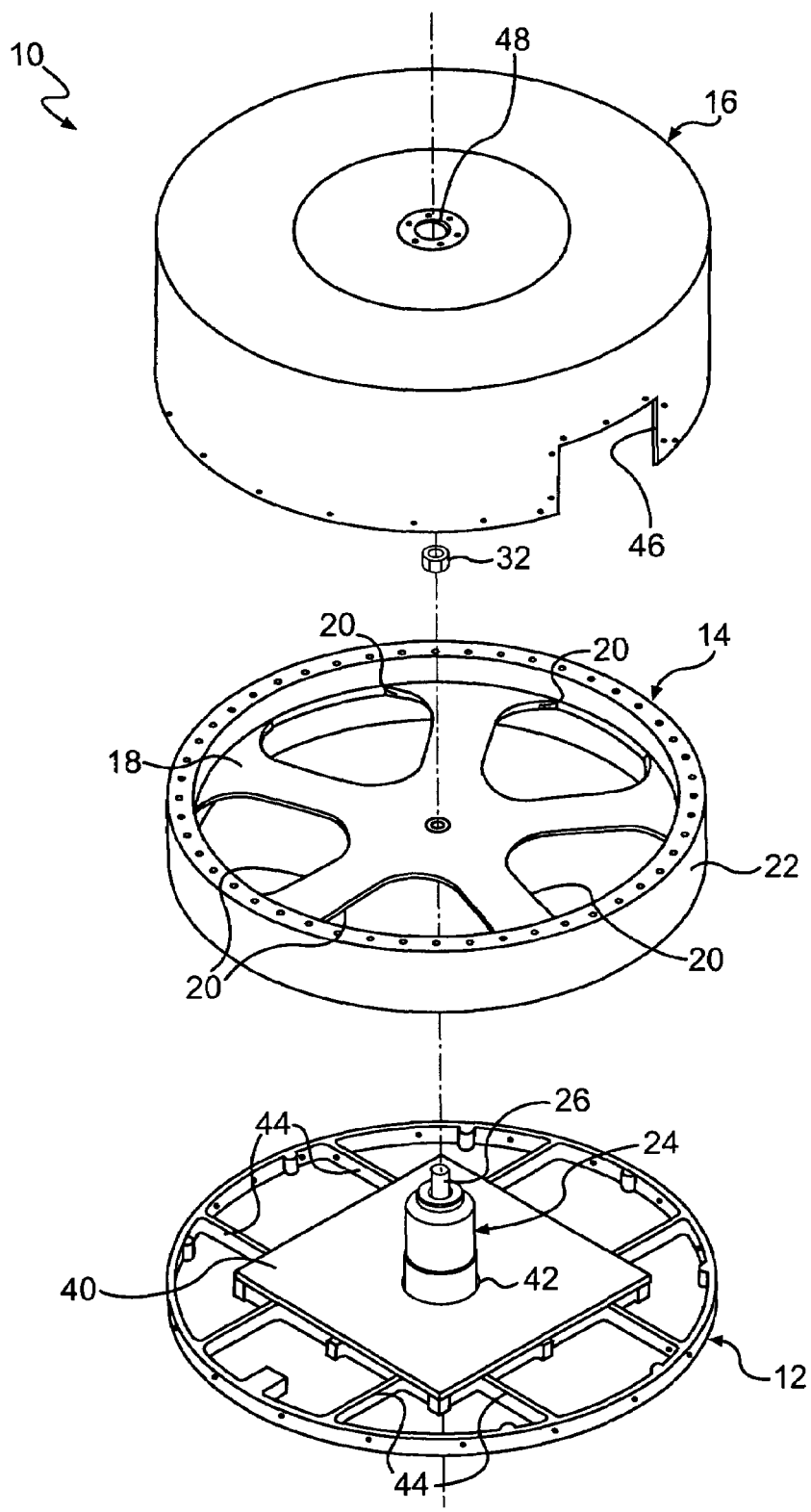
FIG. 2 is an exploded view of the system of FIG. 1.

The system 10 of FIG. 1 is shown in an exploded view in FIG. 2. As shown in FIG. 2, the flywheel 14 comprises a web portion 18 defining a plurality of web openings 20, and a rim portion 22. The flywheel 14 shown in FIG. 2 is provided with five web openings 20 having a substantially identical size. As discussed below, other arrangements of web openings may also be used, such as, for example, a different number of web openings and/or web openings having different shapes and sizes. In addition, the web portion 18 may be substantially planar, as shown in FIG. 1, or may have some degree of slope.

The web portion 18 further defines a total web area and the web openings define an open web area. An open web area of various sizes may be used to achieve demiseability in the momentum exchange system of the present invention. In one embodiment, the open web area is approximately 50% of the total web area. In a further embodiment, the open web area is approximately 60% of the total web area. In yet another embodiment, the open web area is approximately 70% of the total web area.

In one embodiment, a flywheel 14 having an inner diameter (with reference to the rim portion 22) of approximately 16 inches and an outer diameter of approximately 17.6 inches was used. This provided a total web area of approximately 200 square inches. Flywheels having other dimensions may also be used.

As discussed above, embodiments of the momentum exchange system 10 of the present invention may utilize materials having relatively low melting points to achieve demiseability. In one embodiment, the flywheel 14 comprises a material having a melting point below approximately 1500 degrees Celsius. By contrast, both titanium and stainless steel have melting points higher than 1500 degrees Celsius. In another embodiment, the flywheel 14 of the present invention comprises a material having a melting point below approximately 1000 degrees Celsius. In yet another embodiment, the flywheel 14 comprises a material having a melting point below approximately 700 degrees Celsius.

In a further embodiment, the flywheel 14 comprises an aluminum alloy. In one embodiment, Al6061-T6 was used. Other materials having a relatively low melting point may also be used, provided that the materials have suitable weight and strength characteristics.

Figure 3:
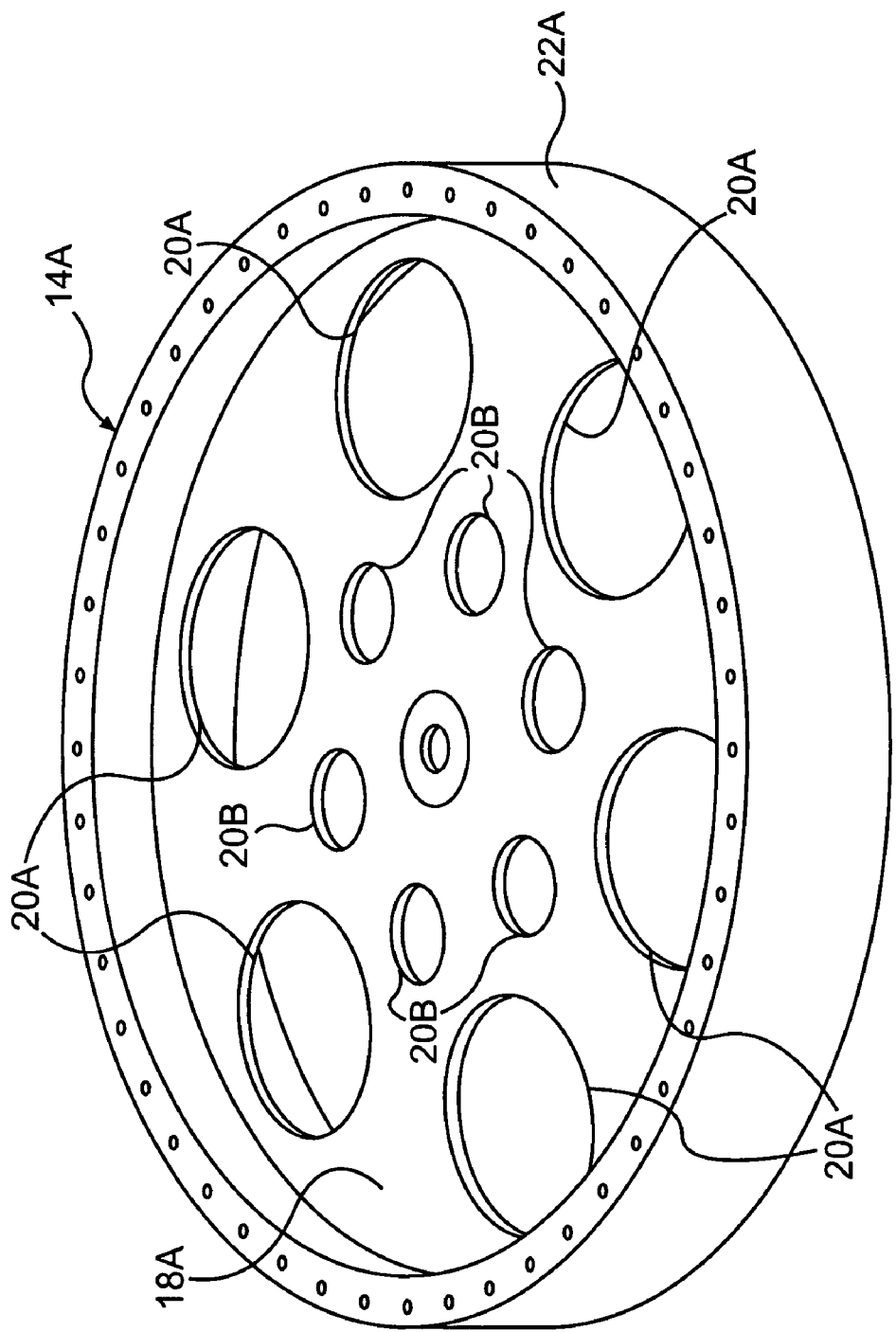
FIG. 3 is a perspective view of an embodiment of a flywheel of the present invention.

Another embodiment of a flywheel 14A according to the present invention is shown in FIG. 3. As shown, the flywheel 14A of this embodiment comprises a web portion 18A and a rim portion 22A. The web portion 18A defines a first plurality of web openings 20A having a first size and a second plurality of web openings 20B having a second size, smaller than the first size.

In the embodiment shown in FIG. 3, the first plurality of web openings 20A is disposed radially outside of the second plurality of web openings 20B. Further, the web openings 20A, 20B have a substantially circular shape. Web openings having other arrangements and shapes may also be used.

As shown in FIGS. 1 and 2, the momentum exchange system 10 further comprises a housing 24 disposed proximate to the center of the base 12. A shaft 26 is supported within the housing 24 by an arrangement of bearings 28 and bearing retainers 30. The bearings 28 may comprise a combination of a radial bearing and duplex bearings sized to minimize chatter, while keeping system power requirements to a minimum. The flywheel 14 is secured to an end of the shaft 26 with a fastener 32. Other fastening arrangements may also be used.

A motor 34 for driving the shaft 26 is also disposed within the housing 24. The motor 34 includes a rotor 36 and a stator 38. The rotor 36 comprises a plurality of magnets (not shown) encapsulated in resin and secured to the external surface of the shaft 26. The stator 38, which is secured within the housing 24, comprises an iron core with copper windings (not shown), also encapsulated in resin. The stator model utilized in the embodiment of the momentum exchange system 10 shown in FIG. 1 incorporates a minimal amount of iron for a given power rating. Different arrangements of components and components comprising different materials may also be used.

In the embodiment shown in the drawings, a circuit board 40 containing the control electronics (not shown) for the momentum exchange system 10 is disposed on an interior surface of the base 12. The circuit board 40 has a central opening 42 and is disposed peripherally around the housing 24. Other arrangements for the control electronics may also be used.

In the embodiment shown in FIGS. 1 and 2, the base 12 comprises a relatively thin structure having a series of ribs 44 that provide the base 12 with adequate strength and rigidity. Other arrangements of ribs may also be used.

The cover 16 is engageable with the base 12 to substantially enclose the flywheel 14. The cover 16 includes an opening 46 along its periphery to allow the passage of cables (not shown) from the control electronics. Other feed-through arrangements may also be used. There is also a small opening 48 on the flat portion of the cover 16 that serves as a viewing portal during ground operations.

In the illustrated embodiments of the momentum exchange system 10 of the present invention, the cover 16 defines a cover thickness and the web portion 18 of the flywheel 14 defines a web thickness. In some embodiments, the cover 16 may be relatively thin compared to the web portion 18 of the flywheel 14, so that the cover will rapidly demise on reentry. In one embodiment, the cover thickness ranges from approximately 50% to approximately 65% of the web thickness.

In one embodiment, a flywheel 14 having a web thickness of approximately 0.150 inches was used with a cover 16 having a thickness of approximately 0.080 inches. In another embodiment, a flywheel having a variable web thickness was used with a cover 16 having a thickness of approximately 0.063 inches. In that embodiment, the web thickness varied substantially linearly from approximately 0.250 inches near the center to approximately 0.150 inches near the rim 22. Flywheel webs and covers having other thicknesses may also be used.

Further, according to an embodiment of the invention, the base 12 defines a base thickness. In one embodiment, the base thickness is approximately equal to the cover thickness. Thus, the base 12 is also configured to rapidly demise on reentry.

In a another embodiment, the base 12 and the cover 16 comprise a material having a melting point below 700 degrees Celsius. In a further embodiment, the base 12 and the cover 16 comprise an aluminum alloy. Other materials having a relatively low melting point may also be used, provided that the materials have suitable weight and strength characteristics.

The present invention provides a momentum exchange system that may be used with a demiseable spacecraft undergoing uncontrolled reentry. The features of the system, including materials having a relatively low melting temperature, as well as the design and arrangement of the components, contribute to the demise of the momentum exchange system on reentry. One possible scenario of system demise is presented below. The scenario is described with reference to the embodiment of the flywheel shown in FIGS. 1 and 2. However, the description applies equally to a system incorporating the embodiment of the flywheel 14A shown in FIG. 3 or other flywheel embodiments.

As the spacecraft incorporating the momentum exchange system 10 of the present invention reenters the atmosphere, the cover 16 of the system rapidly demises, due to its relatively low thickness and relatively low melting temperature.

Once the cover 16 has demised, the flywheel 14 is then exposed to the atmosphere and the associated deceleration loads and heat of reentry. The web openings 20 in the flywheel 14 allow the other system components to be exposed while the flywheel 14 is still intact.

The web openings 20, the relatively low web thickness, and the relatively low melting temperature of the flywheel 14 expedite its demise. Once the web portion 18 of the flywheel 14 has demised, the rim portion 22 separates, leaving the housing 24 and the base 12 exposed to the atmosphere.

Next the housing 24 begins to demise. As the end of the housing 24 opposite to the base 12 begins to demise, the motor components are exposed. The rotor 36 and stator 38 lose their encapsulating resin, and the magnets and coils then demise. Substantially simultaneously, the base 12 demises.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A momentum exchange system for stabilizing a spacecraft, comprising:
   a base;
   a flywheel rotatably supported on the base, the flywheel comprising a web portion defining a plurality of web openings, and a rim portion;
   a motor for driving the flywheel; and
   a cover for engaging the base to substantially enclose the flywheel, wherein the system is configured to demise on atmospheric reentry with essentially no debris hitting the ground.

2. The system of claim 1, wherein the web portion defines a total web area and the web openings define an open web area, and
   wherein the open web area is approximately 50% of the total web area.

3. The system of claim 1, wherein the web portion defines a total web area and the web openings define an open web area, and
   wherein the open web area is approximately 60% of the total web area.

4. The system of claim 1, wherein the web portion defines a total web area and the web openings define an open web area, and
   wherein the open web area is approximately 70% of the total web area.

5. The system of claim 1, wherein the web openings have a substantially identical size.

6. The system of claim 1, wherein the web openings have a substantially circular shape.

7. The system of claim 1, wherein the plurality of web openings comprises:
   a first plurality of web openings having a first size; and a second plurality of web openings having a second size, smaller than the first size.

8. The system of claim 7, wherein the first plurality of web openings is disposed radially outside of the second plurality of web openings.

9. The system of claim 1, wherein the flywheel comprises a material having a melting point below approximately 1500 degrees Celsius.

10. The system of claim 1, wherein the flywheel comprises a material having a melting point below approximately 1000 degrees Celsius.

11. The system of claim 1, wherein the flywheel comprises a material having a melting point below approximately 700 degrees Celsius.

12. The system of claim 1, wherein the flywheel comprises an aluminum alloy.

13. The system of claim 1, further comprising a housing disposed on the base, wherein the flywheel is rotatably supported by the housing.

14. The system of claim 13, wherein the motor is disposed within the housing.

15. The system of claim 1, wherein the cover defines a cover thickness and the web portion defines a web thickness, and
wherein the cover thickness ranges from approximately 50% to approximately 65% of the web thickness.

16. The system of claim 1, wherein the cover defines a cover thickness and the web portion defines a web thickness, and
wherein the cover thickness is less than approximately 50% of the web thickness.

17. The system of claim 15, wherein the base defines a base thickness, and
wherein the base thickness is approximately equal to the cover thickness.

18. The system of claim 1, wherein the base and the cover comprise a material having a melting point below 700 degrees Celsius.

19. The system of claim 18, wherein the base and the cover comprise an aluminum alloy.

20. The system of claim 1, wherein the momentum exchange system comprises at least one of a control moment gyro, a momentum wheel assembly, and a reaction wheel assembly.

21. A momentum exchange system for stabilizing a spacecraft, comprising:
a base;
a housing associated with the base;
a flywheel rotatably supported on the housing, wherein the flywheel comprises a material having a melting point below approximately 1500 degrees Celsius;
a motor for driving the flywheel; and
a cover substantially enclosing the flywheel, wherein the system is configured to demise on atmospheric reentry with essentially no debris hitting the ground.

22. The system of claim 21, wherein the flywheel comprises an aluminum alloy.

23. The system of claim 21, wherein the flywheel comprises a web portion defining a plurality of web openings, and a rim portion.

24. The system of claim 23, wherein the web portion defines a total web area and the web openings define an open web area, and
wherein the open web area is approximately 50% of the total web area.

25. The system of claim 23, wherein the web portion defines a total web area and the web openings define an open web area, and
wherein the open web area is approximately 60% of the total web area.

26. The system of claim 23, wherein the web portion defines a total web area and the web openings define an open web area, and
wherein the open web area is approximately 70% of the total web area.

27. The system of claim 23, wherein the web openings have a substantially identical size.

28. The system of claim 23, wherein the web openings have a substantially circular shape.

29. The system of claim 23, wherein the plurality of web openings comprises:
a first plurality of web openings having a first size; and
a second plurality of web openings having a second size, smaller than the first size.

30. The system of claim 29, wherein the first plurality of web openings is disposed radially outside of the second plurality of web openings.

31. The system of claim 23, wherein the cover defines a cover thickness and the web portion defines a web thickness, and
wherein the cover thickness ranges from approximately 50% to approximately 65% of the web thickness.

32. The system of claim 31, wherein the base defines a base thickness, and
wherein the base thickness is approximately equal to the cover thickness.

33. The system of claim 23, wherein the cover defines a cover thickness and the web portion defines a web thickness, and
wherein the cover thickness is less than approximately 50% of the web thickness.

34. The system of claim 21, wherein the motor is disposed within the housing.

35. The system of claim 21, wherein the base and the cover comprise a material having a melting point below 700 degrees Celsius.

36. The system of claim 35, wherein the base and the cover comprise an aluminum alloy.

37. The system of claim 21, wherein the momentum exchange system comprises at least one of a control moment gyro, a momentum wheel assembly, and a reaction wheel assembly.

38. A momentum exchange system for stabilizing a spacecraft, comprising:
a base;
a housing disposed on the base;
a flywheel rotatably supported on the housing, the flywheel comprising a web portion defining a plurality of web openings, and a rim portion, wherein the flywheel comprises a material having a melting point below approximately 1500 degrees Celsius;
a motor for driving the flywheel; and
a cover engageable with the base to substantially enclose the flywheel, wherein the system is configured to demise on atmospheric reentry with essentially no debris hitting the ground.

* * * * *